United States Patent [19]
Reed et al.

[11] 3,873,671
[45] Mar. 25, 1975

[54] PROCESS FOR DISPOSAL OF OXIDES OF NITROGEN

[75] Inventors: Robert D. Reed; Eugene C. McGill, both of Tulsa; Charles G. McConnell, Cyril, all of Okla.

[73] Assignee: John Zink Company, Tulsa, Okla.

[22] Filed: Feb. 1, 1973

[21] Appl. No.: 328,785

Related U.S. Application Data

[63] Continuation-in-part of Ser. No. 158,058, June 29, 1971, abandoned, which is a continuation of Ser. No. 811,048, March 27, 1969, abandoned.

[52] U.S. Cl.............. 423/235, 423/245, 423/246, 423/248, 23/277 C, 431/5
[51] Int. Cl............................................. B01d 53/34
[58] Field of Search .......... 423/235, 239, 246, 247, 423/210, 245; 23/277 C

[56] References Cited
UNITED STATES PATENTS

| | | | |
|---|---|---|---|
| 2,248,994 | 7/1941 | Houdry | 423/246 |
| 2,673,141 | 3/1954 | Barman | 423/235 |
| 3,232,713 | 2/1966 | Felder | 423/235 |

*Primary Examiner*—Earl C. Thomas

[57] ABSTRACT

A process for converting gases containing oxides of nitrogen into gases which may be safely vented to the atmosphere wherein the gases containing the oxides of nitrogen (NOx) are mixed with excess combustible products obtained by burning a hydrocarbon fuel with less than its stoichiometric requirements of oxygen, the mixture thus obtained is cooled to avoid temperatures substantially above 2,000° F. but not below about 1,200° F., the combustible material remaining after substantially all of the oxides of nitrogen have been reduced to nitrogen are oxidized, so that the resulting gas, substantially free of NOx and carbon monoxide (CO), may be vented to the surrounding atmosphere without contamination of the environment and without smoke or other particulate matter.

12 Claims, 2 Drawing Figures

3,873,671

PROCESS FOR DISPOSAL OF OXIDES OF NITROGEN

RELATED APPLICATIONS

This application is a continuation-in-part copending application of Ser. No. 158,050, filed June 29, 1971, now abandoned, which is a continuation of Ser. No. 811,048, filed Mar. 27, 1969, now abandoned.

KNOWN PERTINENT PRIOR ART

U.S. Pat. No. 2,673,141, issued Mar. 23, 1954;
U.S. Pat. No. 3,232,713, issued Feb. 1, 1966.

BACKGROUND

The present invention relates to a process for avoiding air pollution and more particularly to a method for converting gases which contain oxides of nitrogen (NOx) into gases which may be vented safely to the surrounding atmosphere.

More particularly, the process of this invention not only removes objectionable NOx gases, but also objectionable gases such as carbon monoxide (CO) which are vented substantially smokelessly into the surrounding atmosphere.

Several industrial processes produce waste gases containing oxides of nitrogen in quantities too great for discharge into the air. Various methods for the disposing of waste gases containing oxides of nitrogen have been proposed, and one provides for their absorption in water and the recovery of nitric acid therefrom. Such processes require large investments and often do not provide sufficient acid to justify coping with the many corrosion problems encountered in the complicated processes required to produce the acid at an economic concentration. It also has been proposed to subject such waste gases to a reducing flame where the oxides of nitrogen are reduced to nitrogen such as disclosed in U.S. Pat. No. 2,673,141. In such a process the amount of solid combustible material suspended in the gas exceeds the oxygen available from the oxides of nitrogen with the result that smoke emission becomes a problem as a result of unburned carbon in the gas. Further, said patent does not provide a process to reduce carbon monoxide concentration to values that will eliminate contamination.

Accordingly, it is an object of the present invention to provide a method for converting waste gases into gases which can be safely vented to the surrounding environment by providing a method for reducing oxides of nitrogen in waste gases to nitrogen without introducing the problem of excessive smoke emission.

Another object of the invention is to provide a process for freeing gases from oxides of nitrogen while avoiding the production of a gas containing sufficient quantities of incompletely oxidized materials to eliminate smoke emission problems.

Other objects will be appreciated and become apparent as the present disclosure proceeds and from a consideration of the following description taken in conjunction with the accompanying drawings.

SUMMARY

The foregoing objects and others are accomplished in accordance with this invention by providing a process wherein a fuel is burned with at least about 65 percent but less than 100 percent of its stoichiometric requirements of oxygen. Usually such oxygen is supplied by air, but may be supplied by a NOx stream or a stream of air containing NOx. The resulting combustible products are mixed with gases containing oxides of nitrogen. These oxides of nitrogen are mixed in a ratio to provide an excess of oxidizable material under conditions which some of the combustible products will be oxidized by oxygen made available from the decomposition of the nitrogen oxides. The remaining oxidizable combustible products such as CO, $H_2$, $CH_4$, $SO_2$ etc. are then mixed with an excess of oxygen under conditions where substantially all of the oxidizable combustion products are oxidized, and preferably under a condition which substantially eliminates reformation of any oxides of nitrogen. Heat developed by oxidation or combustion is absorbed by a cooling fluid during combustion to prevent sufficient temperature rise to cause the formation of added quantities of NOx. The volume of oxygen used to oxidize the combustibles remaining after the oxygen from the oxides of nitrogen has been used is controlled to provide only a slight excess to avoid excessive formation of the nitrogen. Preferably, not more than about one percent excess oxygen over stoichiometric requirements for complete oxidation is used. It is believed that this occurs by controlling the partial pressure of said oxygen.

It has been found that gases containing oxides of nitrogen can be converted into environmentally safe vented gases by flowing such NOx gases into a zone adjacent a flame burning a fuel containing hydrocarbons or hydrogen, CO or a combination of these in the presence of less than its stoichiometric requirements of oxygen for complete combustion of the fuel without producing gas with smoke emission problems provided the reduction of the oxides of nitrogen and subsequent treatment of the gaseous product are conducted under controlled conditions. In carrying out the invention the waste gases containing oxides of nitrogen are fed into a combustion chamber into or in close proximity to a reducing flame which is burning a fuel with less than stoichiometric requirements of oxygen. The oxides of nitrogen become mixed with incompletely oxidized combustible materials such as carbon monoxide and hydrogen and various other oxidation products obtained by burning the fuel under these conditions. Such incompletely oxidized products are further oxidized by the oxygen in the nitrogen oxides to form carbon dioxide and water while the nitrogen oxides are reduced to nitrogen. In order that the waste gases are stripped of substantially all of the oxides of nitrogen, the oxygen supply to the flame and the volume of waste gases fed into the zone adjacent the flame are controlled to insure an excess of combustible or oxidizable material in the resulting mixture. A cooling fluid substantially free from available oxygen is subsequentially fed to control the temperature of said resulting mixture between about twelve hundred degrees Fahrenheit and not substantially above two thousand degrees Fahrenheit and desirable between about eighteen hundred and two thousand degrees Fahrenheit. Then, to avoid venting the excess incompletely oxidized combustible material such as carbon monoxide and hydrogen to the surrounding environment, air is introduced into the combustion chamber to oxidize the intermediate oxidation products such as carbon monoxide, hydrogen, alcohol, aldehydes, hydrocarbons or other oxidizable materials to carbon dioxide and water. In one embodiment to recover heat the gas is cooled in heat exchange equipment during this oxidation before it is vented to the atmosphere.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
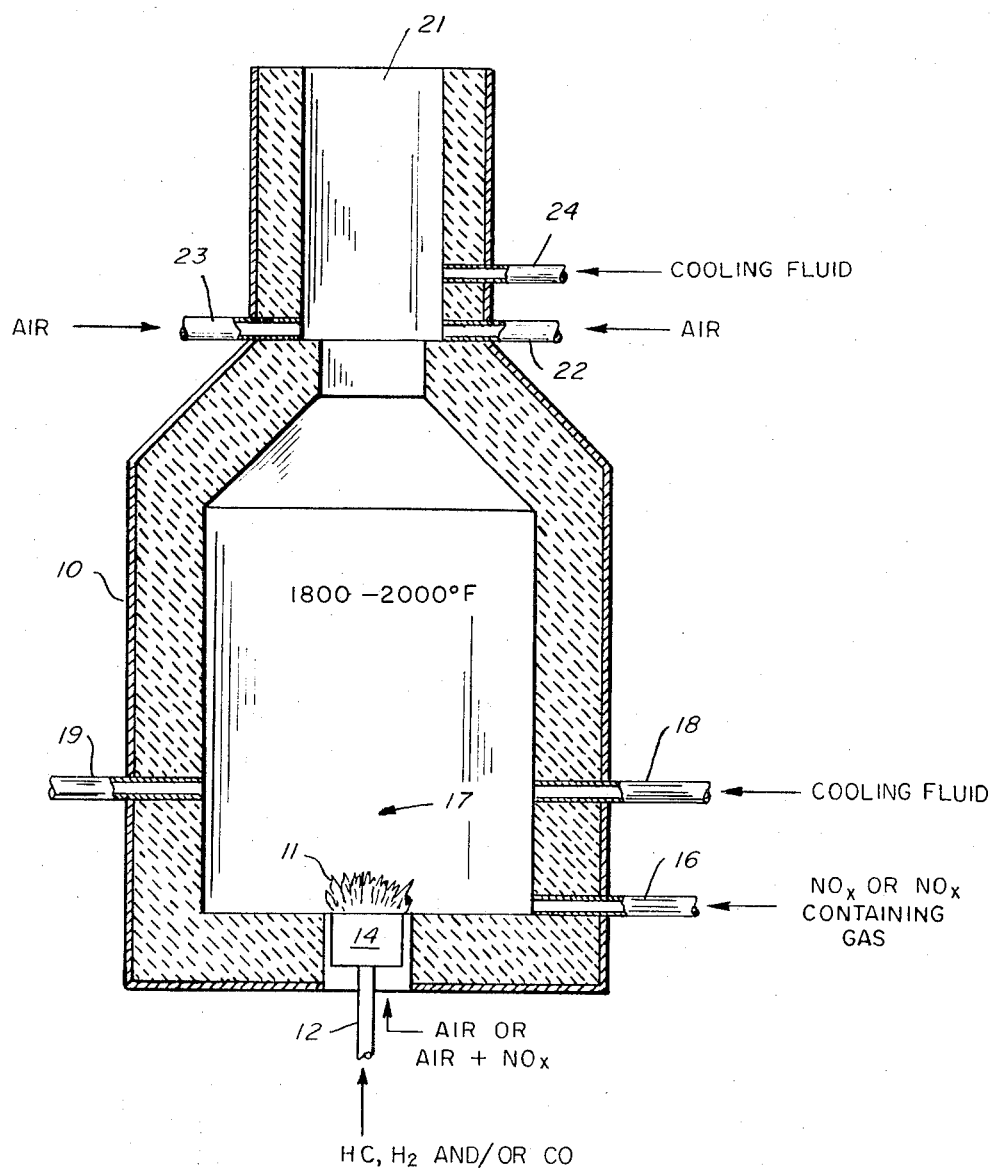
FIG. 1 is a schematic representation of an apparatus used to perform the basic process of this invention.

Referring now to FIG. 1, a furnace having a steel shell 10 lined with refractory material is shown with a flame 11 burning within the lower portion thereof. A hydrocarbon such as methane is supplied through a pipe 12 to a burner assembly 14 while air is admitted through the burner assembly at a rate to provide about 65 percent of the stoichiometric requirements of oxygen for complete combustion of the hydrocarbon. In some instances the air may be air contaminated with NOx, CO, etc. For example, a waste gas containing about 20,000 parts per million of mixed oxides of nitrogen such as nitrous oxide, nitric oxide, nitrogen trioxide, nitrogen peroxide and nitrogen pentoxide is fed through a conduit 16 and into the zone 17 adjacent the flame 11. It is to be understood that nitrogen oxide or oxides alone or nitrogen oxide or oxides with other gases may be fed through conduit 16. The combustible products of the methane include methyl alcohol, formaldehyde, carbon monoxide and hydrogen which becomes mixed in combustion zone 17. The temperature in combustion zone 17 is preferably maintained at 1800° to 2000° Fahrenheit by introducing a cooling fluid through tubes 18 and 19. As the gaseous mixture flows upwardly through zone 17 toward zone 21, the combustible products are oxidized by oxygen stripped from the oxides of nitrogen reducing them to nitrogen. The fuel flow to the burner is regulated to insure there is always an excess of combustible products, predominately carbon monoxide and hydrogen in zone 17 so there is a demand for all the oxygen available from the oxygen in the oxides of nitrogen.

The mixture of nitrogen and excess carbon monoxide, hydrogen and the other oxidizable materials are mixed with air admitted through pipes 22 and 23 as the gaseous mixture leaves zone 17. Air flow is controlled to insure oxidation of substantially all combustible material to avoid venting of undesirables such as carbon monoxide and hydrogen and particulate matter such as carbon particles from zone 21. A cooling fluid flows into zone 21 through the pipe 24 to absorb heat developed during the oxidation in zone 21. The gas leaving the zone 21 is substantially free from carbon, carbon monoxide and hydrogen and NOx so as to be vented safely into the surrouding environment. The volume of air introduced through the pipes 22 and 23 is regulated preferably to produce less than one percent oxygen in excess of the stoichiometric requirements of the combustibles such as carbon, carbon monoxide and hydrogen compounds, etc. in the gas to prevent substantial conversion or reformation of nitrogen to NOx.

By controlling the volume of air supplied to burner assembly 14 and properly regulating the volume of gas through the conduit 16 and maintaining the temperature preferably between about 1800° Fahrenheit and about 2000° Fahrenheit, and furnishing the proper quantity of air through pipes 22 and 23, the oxides of nitrogen can be substantially reduced to nitrogen, and the fuel oxidized to harmless carbon dioxide and water thus converting the undesirable gas flowing through conduit 16 into a harmless and smokeless gas substantially free from free particulate matter or smoke flowing from zone 21.

Although any fuel which can be substantially completely oxidized to carbon dioxide and water such as coal, oil, liquid hydrocarbons and the like are contemplated, best results are obtained with gaseous fuels such as methane or natural gas containing lower molecular weight hydrocarbons which normally burn with a clear flame substantially free from carbon.

Figure 2:
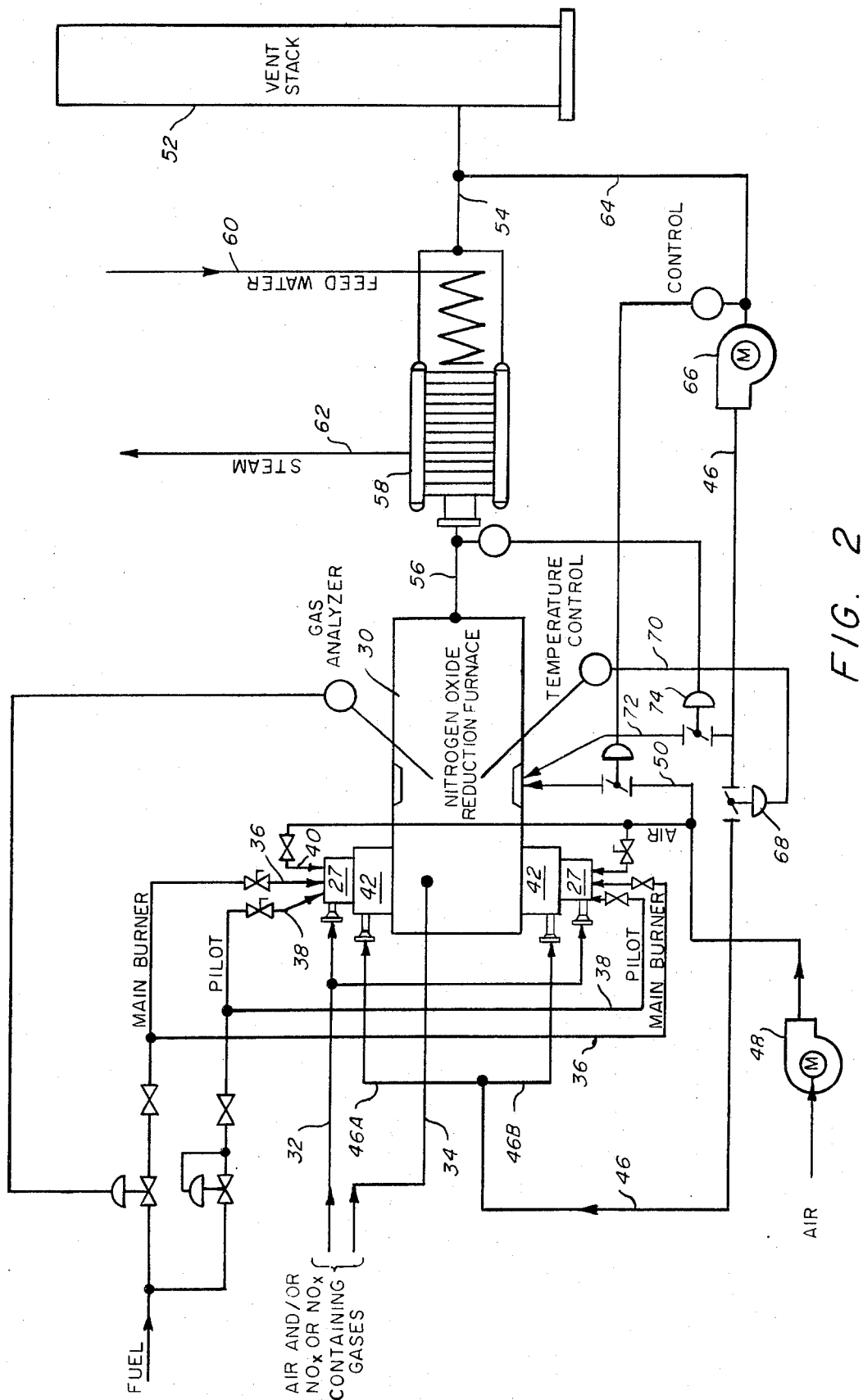
FIG. 2 is a schematic flow diagram of another embodiment utilizing the process of this invention.

Referring to FIG. 2, nitrogen oxide containing gases from one or a plurality of sources are caused to flow into one or a plurality of burners 27 which are directed into a furnace 30 via conduit 32 and/or directly to furnace 30 via conduit 34. Air is supplied and controlled in amounts to support combustion yet less than the stoichiometric amount required to support full combustion of the fuel injected as heretofore defined. Fuel is injected into the burners via conduits 36. Suitable pilot gas conduits 38 and supporting air conduits 40 are provided to initiate and/or maintain combustion.

A quench fluid such as the cooled inert gas composed primarily of nitrogen ($N_2$), carbon dioxide ($CO_2$) and water ($H_2O$) is injected via conduits 46A and 46B into a plenum space 42 subsequent to the initial burner operation. The quench and the subsequent combusted fuel enters the furnace 30 under such conditions that the oxides of nitrogen are reduced, the quench acting to control the temperature to prevent reoxidation of the nitrogen ($N_2$) to NOx. Subsequently thereto and still within the furnace 30 the excess fuel is oxidized by injecting secondary air, supplied by a blower 48 via one or more donduits 50, the control of such air being a function of the characteristics (temperature and composition) of the inert gases to vent stack 52 via outlet 54. The effluent from the furnace is directed, as for example, through a conduit 56, to a means of utilizing the heat as for example a waste heat boiler and economizer 58 in which relatively cool feed water entering via conduit 60 is converted to useful energy (steam) via conduit 62. The effluent of inert gases in conduit 54 has all or substantially all of the oxides of nitrogen removed at least to an acceptable level. The gases are then passed through the vent stack 52 and/or portions thereof recycled by way of conduit 64 to the intake of fan or blower 66 via conduit 46 to the quench plenum 42. A control valve 68 operates to supply proper quantity of quench fluid in accordance with a temperature sensing means 70. In some instances it may be desirable to introduce quench fluid via line 72 into the furnace as further control over the temperature therein preventing reformation of nitrogen oxides. This control is accomplished by valve 74 which is further controlled as a function of the temperature within the effluent 56 from the nitrogen oxide reduction furnace 30.

It is important that the temperature within the combustion zone be maintained within the above specified limits to insure proper oxidation and reduction while avoiding substantial damage to the refractory material. Any suitable liquid or gas substantially free from available oxygen such as nitrogen, carbon dioxide, water, etc., may be used as a coolant.

The following examples illustrate the process of this invention.

EXAMPLE 1

Bunker C or No. 6 fuel oil was injected into a furnace by steam atomization. Air for the fuel was obtained from a ventilation source and contained up to 0.4 percent by volume of NOx. The amount of oxygen available in the air stream was insufficient to give complete combustion. Into the burning zone gases containing 0.2 percent NOx plus 3 percent $O_2$, and 96.8 percent $N_2$ (all percentages by volume) were injected to mix with the products of the fuel combustion. A portion of the vent stack 600° F. gas, containing small quantities of $O_2$ with the remainder being $N_2$, $CO_2$ and water vapor, was recycled into the combustion chamber to maintain the temperature therein at about 1,800°–2,000° F. After about 2 seconds residence time, air was injected to burn the combustibles. The resulting mixture was then fed to a waste heat boiler to generate steam, to cool the resultant gas mixture to about 600° F. for discharge into a vent stack and recycle blower. The resultant vent gases were smokeless and colorless being substantially reduced in NOx and CO and thus safely vented into the surrounding environment.

EXAMPLE 2

Hot waste gases containing approximately 14 percent $O_2$ and 1.2 percent NOx (by volume) were injected into a combustion chamber using natural gas as fuel and some air. The total oxygen available for the fuel combustion was approximately 70 percent of the stoichiometric needs to completely convert the fuel to $CO_2$ and $H_2O$. After burning and mixing the resultant gas, containing some NOx and combustibles such as CO, $H_2$, etc., passed into a two stage reduction zone for the purpose of converting NOx compounds to nitrogen. Between the reduction zone stages recycle vent gases at approximately 600° F. were admitted to the system for temperature control in the subsequent burning (reoxidation) of the remaining combustibles to prevent reformation of NOx compounds from the available oxygen and nitrogen. These gases pass through a waste-heat boiler to a vent stack with a portion thereof being recycled as mentioned. The following Table gives results of the test:

TABLE

|  | 1 | 2 | 3 | 4 | 5 | 6 | 7 |
|---|---|---|---|---|---|---|---|
| Fuel Rate, SCFH | 2490 | 2542 | 2626 | 2447 | 2375 | 2300 | 2360 |
| Combustion Air Rate, SCFH | 7680 | 7680 | 7680 | 7680 | 7680 | 7680 | 7680 |
| Waste Gas Rate, SCFH | 22,800 | 22,800 | 22,800 | 22,800 | 22,800 | 23,036 | 23,240 |
| NOx Waste Gas Composition (Percentage by Volume): | | | | | | | |
| $O_2$ | 14.5 | 14.5 | 14.5 | 14.5 | 14.5 | 14.0 | 12.5 |
| $H_2O$ | 5.2 | 5.2 | 5.2 | 5.2 | 5.2 | 5.7 | 7.4 |
| $N_2$ | 76.4 | 76.4 | 76.4 | 76.4 | 76.4 | 76.2 | 75.1 |
| $CO_2$ | 2.6 | 2.6 | 2.6 | 2.6 | 2.6 | 2.8 | 3.7 |
| NOx | 1.2 | 1.2 | 1.2 | 1.2 | 1.2 | 1.2 | 1.2 |
| Temperatures, °F.: | | | | | | | |
| Reduction Burner | 2450 | 2370 | 2410 | 2400 | 2360 | 2400 | 2460 |
| Reduction Tower #1 | 2080 | 2020 | 2000 | 2010 | 2000 | 2000 | 2005 |
| Reduction Tower #1 Exit | 1960 | 1925 | 1820 | 1820 | 1810 | 1810 | 1810 |
| Reduction Tower #2 | 1510 | 1500 | 1450 | 1500 | 1490 | 1480 | 1480 |
| Reduction Tower #2 Exit | 1380 | 1355 | 1360 | 1360 | 1350 | 1350 | 1350 |
| Reoxidation | 1710 | 1670 | 1700 | 1670 | 1600 | 1600 | 1400 |
| Boiler Discharge | 550 | 545 | 550 | 550 | 540 | 560 | 605 |
| NOx Feed | 560 | 600 | 620 | 615 | 610 | 650 | 670 |
| Vent Gas Composition Percentage: | | | | | | | |
| $O_2$ | 1.6 | 1.6 | 1.6 | 0.8 | 0.5 | 4.0 | 3.6 |
| $H_2O$ | 17.7 | 17.7 | 17.7 | 19.4 | 19.9 | 16.2 | 17.4 |
| $N_2$ | 70.4 | 70.4 | 70.4 | 68.4 | 67.6 | 71.6 | 71.2 |
| $CO_2$ | 10.3 | 10.3 | 10.3 | 11.6 | 11.2 | 8.1 | 8.7 |
| CO PPM | <200 | <200 | <200 | <200 | <200 | <200 | <200 |
| NOx OUT PPM | 152 | 200 | 250 | 160 | 150 | 100 | 85 |
| NOx IN PPM | 12,000 | 12,000 | 12,000 | 12,000 | 12,000 | 12,000 | 12,000 |

What is claimed is:

1. A process of converting gases containing oxides of nitrogen into gases which may be vented safely to the surrounding environment which comprises:

burning a fuel in a first zone in the presence of at least 65 percent but less than 100 percent of said fuel's stoichiometric requirements of oxygen;

mixing said gases containing oxides of nitrogen with the combustion products resulting from said burning in a ratio which provides an excess of oxidizable combustion products over oxygen available from said oxides;

cooling the aforesaid combustion mixture to maintain a temperature that is within the range between about 2000° Fahrenheit and about 1200° Fahrenheit;

mixing, in a second zone, the oxidizable combustion products remaining after substantially all of the oxides of nitrogen have been reduced, with sufficient oxygen to convert substantially all of the oxidizable combustion products remaining to carbon dioxide and water without reformation of oxides of nitrogen; and venting the resultant gas product.

2. A process of claim 1 including the step of:
injecting a cooling fluid to maintain the temperature of said second zone substantially less than 2000° Fahrenheit.

3. A process of claim 1 wherein said required oxygen for such fuel burning is furnished by air and nitrogen oxides.

4. The process of claim 1 wherein the cooling of said combustion mixture comprises the steps of:
cooling said resultant gas product, and
controllably injecting said cooled gas product into said combustion mixture.

5. The process of claim 2 wherein at least a portion of said cooling fluid is cooled resultant gas product.

6. The process of claim 1 wherein said cooling of said combustion mixture in said first zone occurs by indirect contact heat exchange with a cooler fluid.

7. The process of claim 1 including the step of maintaining the temperature of said second zone substantially less than 2,000° F by indirect contact heat exchange with a cooler fluid.

8. The process of claim 1 wherein cooling the aforesaid combustion mixture occurs by feeding substantially oxygen free fluid into the zone of said burning of said fuel.

9. A process of claim 8 wherein said fluid is nitrogen.

10. The process of claim 8 wherein said fluid is carbon dioxide.

11. The process of claim 8 wherein said fluid is water or water vapor.

12. The process of claim 1 wherein water or water vapor is injected with said fuel.

* * * * *